US009486701B2

(12) United States Patent
Yerli

(10) Patent No.: US 9,486,701 B2
(45) Date of Patent: Nov. 8, 2016

(54) COMPUTER-CONTROLLED VIDEO ENTERTAINMENT SYSTEM

(75) Inventor: Cevat Yerli, Frankfurt (DE)

(73) Assignee: Crytek GmbH, Frankfurt am Main (DE)

(*) Notice: Subject to any disclaimer, the term of this patent is extended or adjusted under 35 U.S.C. 154(b) by 292 days.

(21) Appl. No.: 12/974,077

(22) Filed: Dec. 21, 2010

(65) Prior Publication Data
US 2011/0162005 A1 Jun. 30, 2011

Related U.S. Application Data

(60) Provisional application No. 61/291,004, filed on Dec. 30, 2009.

(51) Int. Cl.
| | |
|---|---|
| H04N 5/445 | (2011.01) |
| H04N 7/173 | (2011.01) |
| A63F 13/235 | (2014.01) |

(Continued)

(52) U.S. Cl.
CPC ............. *A63F 13/235* (2014.09); *A63F 13/12* (2013.01); *A63F 13/213* (2014.09); *A63F 13/215* (2014.09); *A63F 13/27* (2014.09); *A63F 13/355* (2014.09); *H04L 29/08549* (2013.01); *H04N 21/2181* (2013.01); *H04N 21/2747* (2013.01); *H04N 21/4223* (2013.01); *H04N 21/42203* (2013.01); *H04N 21/44218* (2013.01); *H04N 21/4781* (2013.01); *H04N 21/6587* (2013.01); *A63F 2300/1081* (2013.01); *A63F 2300/1087* (2013.01); *A63F 2300/1093* (2013.01); *A63F 2300/407* (2013.01); *A63F 2300/409* (2013.01); *A63F 2300/538* (2013.01); *A63F 2300/8023* (2013.01)

(58) Field of Classification Search
CPC ..................... H04N 21/2181; H04N 21/2747; H04L 29/08549
USPC ..................................................... 725/37, 114
See application file for complete search history.

(56) References Cited

U.S. PATENT DOCUMENTS

| | | | | |
|---|---|---|---|---|
| 5,574,669 | A | * | 11/1996 | Marshall ........................ 702/149 |
| 7,843,429 | B2 | * | 11/2010 | Pryor ............................ 345/158 |

(Continued)

OTHER PUBLICATIONS

Adam Hartley, "Does cloud gaming spell the end for consoles?", TechRadar, Feb. 3, 2009, XP-002713875.

(Continued)

*Primary Examiner* — Pankaj Kumar
*Assistant Examiner* — Franklin Andramuno
(74) *Attorney, Agent, or Firm* — Christensen O'Connor Johnson Kindness PLLC

(57) ABSTRACT

A computer-controlled video entertainment system providing user-related input data to said system. The invention provides an rich input sensor device having direct access to an IP-based network, in particular to the Internet, for transmitting sensor signals or data derived thereof as user-related input data via the IP-based network to a remote computing device or server, preferably to a cloud of servers, which then process these input data for controlling the running entertainment program. The sensor device can be made simple, since it is mainly designed to detect user activities and to generate sensor signals which are directly transmitted as input data to the remote computer(s) or server(s). The sensor device can directly communicate with any IP-based computing device (gaming server or the like) being installed remotely and having powerful hardware and software to process the received input data.

19 Claims, 5 Drawing Sheets

(51) Int. Cl.

| | | |
|---|---|---|
| *A63F 13/355* | (2014.01) | |
| *A63F 13/215* | (2014.01) | |
| *A63F 13/213* | (2014.01) | |
| *A63F 13/27* | (2014.01) | |
| *H04N 21/2747* | (2011.01) | |
| *H04L 29/08* | (2006.01) | |
| *H04N 21/218* | (2011.01) | |
| *A63F 13/30* | (2014.01) | |
| *H04N 21/422* | (2011.01) | |
| *H04N 21/4223* | (2011.01) | |
| *H04N 21/478* | (2011.01) | |
| *H04N 21/442* | (2011.01) | |
| *H04N 21/6587* | (2011.01) | |

(56) References Cited

U.S. PATENT DOCUMENTS

| | | |
|---|---|---|
| 2004/0064504 A1 | 4/2004 | Domschitz |
| 2007/0265094 A1* | 11/2007 | Tone .................. G07F 17/32 463/42 |
| 2008/0039202 A1* | 2/2008 | Sawano et al. .............. 463/39 |
| 2009/0042674 A1* | 2/2009 | Shelton .................. 473/450 |
| 2009/0118019 A1* | 5/2009 | Perlman et al. ............. 463/42 |
| 2009/0258703 A1 | 10/2009 | Brunstetter |
| 2009/0315740 A1* | 12/2009 | Hildreth et al. ............ 341/20 |
| 2010/0007582 A1* | 1/2010 | Zalewski ...................... 345/8 |
| 2010/0009747 A1* | 1/2010 | Reville et al. .............. 463/31 |
| 2010/0173712 A1* | 7/2010 | Buhr ........................... 463/42 |
| 2010/0199228 A1* | 8/2010 | Latta et al. ................. 715/863 |
| 2010/0317432 A1* | 12/2010 | Tanabe et al. .............. 463/30 |

OTHER PUBLICATIONS

"PlayStation Eye", Wikipedia, Dec. 10, 2009, XP-002713876.
"Kinect", Wikipedia, Dec. 27, 2009, XP-002713877.
European Search Report for corresponding European Patent Application No. 10196822.0 dated Oct. 7, 2013.

* cited by examiner

COMPUTER-CONTROLLED VIDEO ENTERTAINMENT SYSTEM

The present application is related to and claims benefit under 35 U.S.C. §119(e) of U.S. Provisional Application No. 61/291,004, filed Dec. 30, 2009, the entirety of which is hereby incorporated herein by reference.

FIELD OF THE INVENTION

The present invention relates to a computer-controlled video entertainment system. In particular the invention relates to a computer-controlled gaming system to be used by at least one user wherein the sensor device can detect natural input such as physical gestures or speech. The invention further relates to a system for providing multimedia data for entertaining presentations to a plurality of user (audience) at home or outside in cinemas, theater rooms or the like. In this respect the present invention particularly relates to a system providing computer-based entertainment, like interactive video games or performing interactive movies or shows (so-called theater games) and interactive advertisement games.

BACKGROUND OF INVENTION

Entertainment systems, such as video game systems or devices are well-known and are usually implemented by personal computers (PC) or game consoles which are controlled by at least one user. For controlling these systems the user is equipped with an input control device, such as a gamepad, joystick or mouse, which is linked to the PC or game console by cable. Modern game consoles provide wireless control in that the users are equipped with wireless control devices. The user activity is detected by a sensor device which usually comprises infrared sensing elements. These sensor devices have to be installed in the vicinity of the display device (TV set or monitor) and close to the user's position.

In US 2008/0039202 A1 such a game console with wireless sensor device is disclosed. The sensor device is linked via a cable to the game console which receives the sensor signals and processes these signals as input data for the running game. This means that the input signal and data processing is solely performed by said console, in particular by the processing unit of it. Thus the processing of the sensor signals depends on the layout and design of the processing unit which can have the effect that only a limited number of user control devices can be used. Therefore the system is not designed to be controlled by a large number of users or even by an audience. Moreover, the sensor device is exclusively designed to only work with said console. Thus many of the known sensor devices cannot be used to operate with other systems. Finally, each user is equipped with a control device (wireless gamepad) which still has to be touched. But it would be desirable also to provide a contactless or touch-free control as well.

Beside these drawbacks there are further deficiencies to be mentioned here:

In present systems, the computing, such as rendering, is performed by the processor of the used personal computer or game console. Consequently any update of hardware or software has to be made locally and involves high costs. Since many producers of consoles even keep the hardware and software protected, the users are forced to wait for new releases and have to buy them from the producers. In cinema gaming systems the hardware and software is normally implemented by a computer or server which is installed at the cinema or theater. Consequently a high invest has to be made at each cinema and any updating has to be made on site. This makes it harder and costly to frequently update or upgrade the systems and thus to stay in line with the developing technology of rendering computer graphics and movies. Moreover the known systems are not prepared to provide touch-free control equipment.

SUMMARY OF INVENTION

According to a first aspect of the present invention there is provided a computer-controlled video entertainment system, the system comprising:
 a display device for displaying video entertainment pictures to at least one user;
 at least one computing device being installed remotely from said display device and executing an entertainment software application for providing output data to be transmitted via an IP-based network to said the display device to display the video entertainment pictures;
 a sensor device being installed in the vicinity of said display device and said at least one user for providing user-related input data to be processed by said entertainment software application, the sensor device comprising or including a network interface for transmitting said input data via said IP-based network to said at least one computing device.

According to a further aspect of the invention there is provided a sensor device for a computer-controlled video entertainment system comprising a display device for displaying video entertainment pictures to at least one user; at least one computing device being installed remotely from said display device and executing an entertainment software application for providing output data to be transmitted via an IP-based network to said the display device to display the video entertainment pictures; wherein the sensor device is installed in the vicinity of said display device and said at least one user for providing user-related input data to be processed by said entertainment software application, and wherein the sensor device comprises a network interface for transmitting said input data via said IP-based network to said at least one computing device.

Thus the invention provides an easy-to-install sensor device having direct access to an IP-based network, in particular to the Internet, for transmitting sensor signals or data derived thereof as user-related input data via the IP-based network to a remote computing device or server, preferably to a cloud of servers, which then process these input data for controlling the running entertainment program. The effort for realizing said sensor device in terms of hardware and software can be kept very low. The sensor device can be made simple, since it is mainly designed to detect user activities and to generate sensor signals which are directly transmitted as input data to the remote computer(s) or server(s). Because of the fact that the sensor device can directly be connected to the IP-based network (e.g. Internet) it can directly communicate with any IP-based computing device (gaming server or the like) being installed remotely and having powerful hardware and software to process the received input data. Thus there is no need to have a computer or game console being installed at the location of the user(s). Moreover, the users even do not need to have more than a sensor device and a display device (TV set or monitor) when they want to enjoy and participate in an entertainment program. The entertainment or gaming program as such is remotely processed by said remote computer(s) under control of said input data. The computer(s) provide(s) output data (in particular video and audio) which are transmitted via the IP-based network back to the location of the user(s) and are then output by the display device (TV set, monitor) being connected to said IP-based network. This means that the users just need to have installed at their location (at home, in a cinema . . . ) a display device which is connected to the Internet and said sensor device which also is connected to the Internet so that both devices can communicate with the remote computer(s) which run(s) the entertainment program. In a preferred embodiment there a several remote gaming computers which form a so-called server cloud. Thus many display devices and sensor devices (i.e. many homes or cinemas) can use the processing power of this server cloud. The installation costs for each user is therefore very low. Moreover, any software updating and/or hardware upgrading only needs to be made on this central server(s). The users need not to take care of updating and/or upgrading, but can always profit from the latest technology.

Thus the invention allows at least one user (player, consumer) to interactively play high-definition entertainment programs, such as games and television shows, using touch-free natural inputs, such as physical gestures and speech. With this invention, there is no need to use a handheld controller device for input (such as a keyboard, game controller, or remote control) or to purchase and install expensive additional hardware such as a game console or computer. Of course there is the option to still have handheld controllers which communicate with the sensor device, if this device is equipped with appropriate hard- and software. The invention is preferably realized as a server (cloud)-based entertainment system. The system mainly consists of a sensor device (which basically is sensor detecting and signal transmitting hardware) and a remote cloud computing and storage infrastructure.

This means that in one of the embodiments of the invention the at least one computing device is constituted by a plurality of remotely installed computing servers being linked to each other to form a cluster or cloud of computing servers. Preferably the computing servers are linked to each other via said IP-based network, wherein said network is constituted by the Internet. At the users' site the network interface of said sensor device is constituted by a wired or wireless Internet module.

In further embodiments of the invention the sensor device comprises a sensor module with at least one sensory element for detecting user activities, in particular natural user inputs such as physical gestures and/or speech, and for producing sensor signals. The sensor device may further comprise a processing unit for pre-processing said sensor signals to generate said user-related input data representing said detected user activities. The at least one sensor element can be an optical sensor for detecting physical gestures or appearance, an acoustical sensor for detecting user-produced speech, sound or noise and/or a thermal sensor for detecting physical presence or temperature.

In one embodiment the processing unit provides said user-related input data to said network interface for being transmitted via said IP-based network to the at least one computing device.

In another embodiment the processing unit receives from the sensor elements the sensor signals and pre-processes these signals to generate the input data, in particular by applying signal and/or data recognition to generate input data which represent recognized user-related input patterns, in particular gestures and/or speech commands. With respect to this, the processing unit may receive sensor signals which relate to a plurality of users and processes these signals to generate collective input data, in particular by applying signal and/or data recognition to generate collective input data which represent recognized multi-user or user-group-related input patterns, in particular collective gestures and/or collective speech commands.

In a further embodiment the sensor device further comprises a visual output or projection module to output visual data (such as instructions or feedback from the game server) to said at least one user. The sensor device may further comprise a wired or wireless interface/networking module to receive further input data from external user input devices, in particular form gamepads, joysticks, keypads, keyboards.

According to the present invention the computing servers of said cluster or cloud can be linked to each other via the Internet to form a flexible resource being accessible via the Internet. Preferably the cluster or cloud of computing servers comprises at least one gateway server which can be accessed by a plurality of home environments or cinemas to build up video streaming links in order to instantly provide high quality video data to the display devices which are installed at the points of presentation, i.e. at the cinemas' locations, halls or rooms. Thus every cinema can be linked online to said computing cloud and can receive on request tailored data, in particular rendered video data, for instantly presenting movies, advertisements or games at the respective location. This architecture will here also be referred to as "Online Gaming Server Cloud".

According to another aspect of the present invention the system can comprise at least a first and a second plurality of computing servers, each plurality of computing servers being linked to each other to form a first and a second cluster or local cloud of computing servers. One cluster may be the processing cluster for running the gaming program, in particular for rendering the graphics under control of the user-related input data. The other cluster may be a content cluster for providing content data to the processing cluster. The overall architecture can be arranged such that the servers of the content cloud (content servers) and the servers of the processing cloud (computing servers) are installed at different locations and are linked to each other via a network or direct link, in particular via the Internet. On the one hand the content server(s) constitute(s) a game catalogue with a content data of a large number of games, the content data being input data for game engine(s). On the other hand the computing server cloud hosts a dynamic game engine, in particular a graphics or rendering engine, to process the content data for generating ready-made data which can be transmitted to the respective projector or display device. When running a game which is presented to an audience of players who are sitting in a room such as living room, cinema, theater etc. the game server cloud(s) will receive the respective content data and compute these data to generate the rendered video data for visual presentation. Further the game server cloud(s) may compute audio data for acoustic presentation and further output data, such as control data for vibration devices integrated into the gamepads or the like.

In one of the embodiments of the invention the system is a home environment gaming system. In another embodiment the system is theater gaming system and the method of providing the data also comprises the step of controlling a display device by the output data to present images, movies, advertisements and/or games to the at least one audience. The method can also comprise the step of receiving input data or signals from the at least one audience before providing the content data by at least one content server, wherein the content data is selected from a database in dependence of the input data or signals. The input data may come from the gamepads being installed at the seats for the audience. The method may also comprise the steps of: receiving input data or signals from the at least one audience before or during the presentation of images, movies, advertisements and/or games, wherein presentation of images, movies, advertisements and/or games audience is displayed in dependence of the input data or signals.

BRIEF DESCRIPTION OF THE DRAWINGS

Further features and advantages of the present invention, as well as the structure and operation of various illustrative embodiments of the present invention, are described in more detail below with reference to the accompanying schematic drawings, wherein.

DETAILED DESCRIPTION OF PREFERRED EMBODIMENTS

Figure 1:
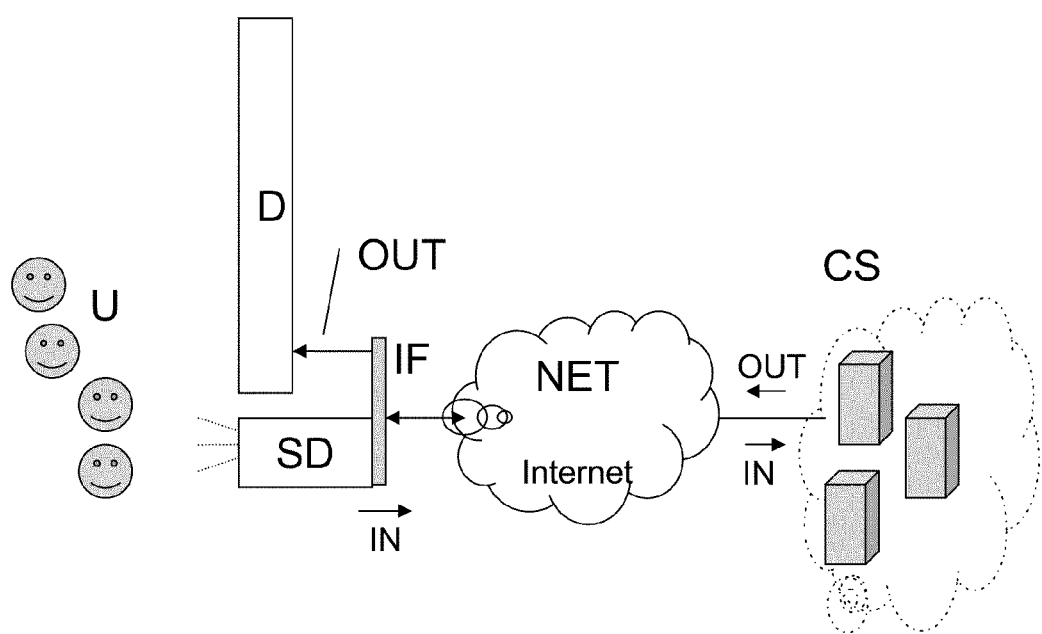
FIG. 1 shows the architecture of a computer-controlled video entertainment system of the invention according to a first embodiment.

In FIG. 1 there is shown the architecture of a computer-controlled video entertainment system of the invention, the system being implemented as a multi-user gaming system for providing entertainment to a plurality of users U, such as members of a family at home or the members of an audience in a cinema or theatre.

At the users' site there is installed a display device D which can be e.g., a flat panel LCD or a video projection screen, and a sensor device SD, both devices being linked via an interface IF to an IP-based network which is constituted by the Internet. Thus the display device D can receive output data OUT (video, audio) from (a) remote computing device(s) CS to be presented to the users U. The sensor device SD detects user activities to provide and transmit user-related input data IN via the Internet to said remote computing device(s) CS. In the shown embodiment there are several computing devices in form of a cluster or cloud of data processing severs which run the gaming program under control of said user-related input IN.

Since the cloud of servers CS is a very powerful processing resource which can quite easily be extended, the system can provide entertainment to a large number of users (hundreds, thousands or even much more) and/or to a plurality of locations (homes, cinemas, theatres . . . ). Thus many single users and/or a variety of audiences can be provided with entertainment services. To simplify the explanation of the invention the configuration as shown in FIG. 1 relates to a single audience of users U.

In FIGS. 2 to 5 different embodiments of a sensor device SD for detecting user activities and for providing user-related input data IN are shown.

Figure 2:
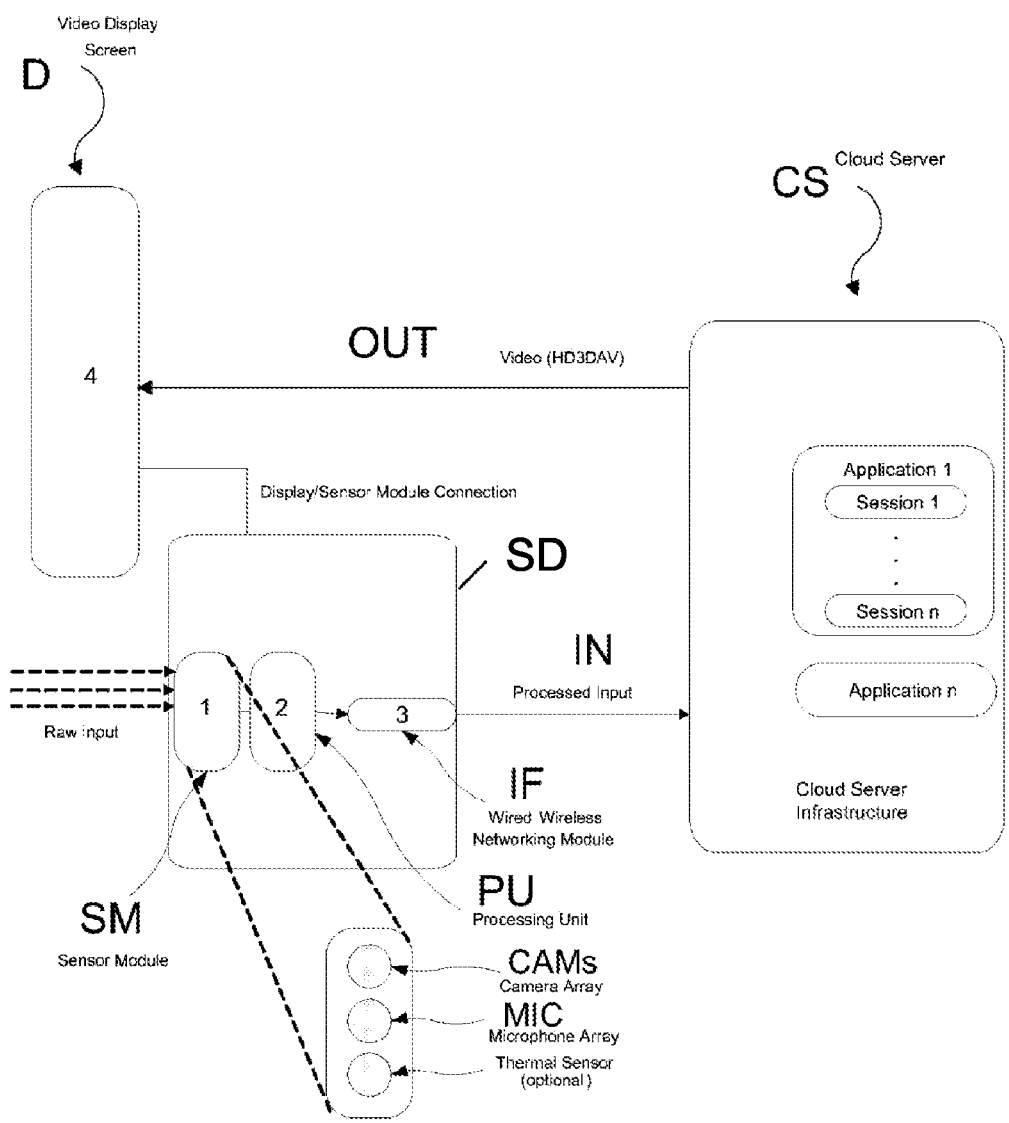
FIG. 2 shows the architecture of FIG. 1 in more detail, wherein the system comprises an external sensor device being connected with the remote cloud server(s) of the system.

The details of first embodiment of FIG. 1 can better be seen by FIG. 2 showing a sensor device SD comprising a sensor module SM having at least one sensor element, namely a camera CAM and a microphone MIC to detect user movements, physical gestures and/or user-produced speech, sounds etc.. Further to this the sensor device has a thermal sensor for detecting the physical presence or condition of the user(s) by detecting the body temperature(s). The sensor device SD is installed in the vicinity of the display device D and near the users to detect their activities. The sensor device SD further comprises a processing unit PU which can be implemented by a low-cost microprocessor to receive the sensor signals from the sensor elements CAM and MIC and to generate user-related input data IN which shall be transmitted to the remote cloud servers CS, one of which is shown in FIG. 2. In order to transmit the input data IN via an IP-based network (see FIG. 1) the sensor device SD also comprises an interface IF in form of an networking module which can be implemented by a wired or wireless Internet access module.

Thus the sensor device SD as shown in FIG. 2 can be realized as an universal and low-cost sensor device performing a touch-free detection to provide (in uplink direction) user-related input data IN to any remote computer or server CS which runs a entertainment or gaming program. The at least one server CS then produces output data OUT to be transmitted (in downlink direction) back to the users' location for being output at the display device D. The display device D may have its own interface for IP network access or may use the networking module as common interface IF to the Internet (also see FIG. 1).

Figure 3:
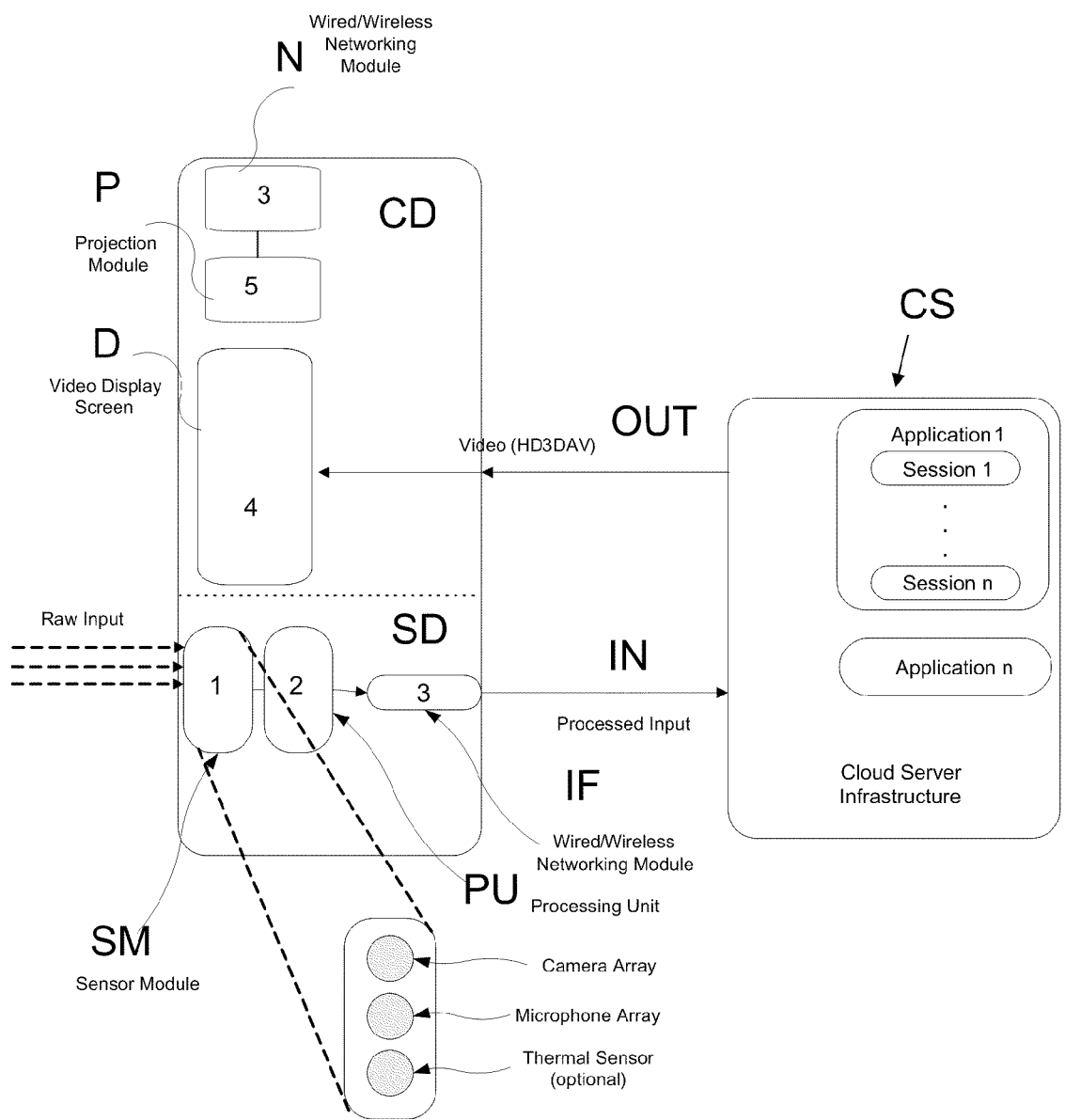
FIG. 3 shows a second embodiment wherein the sensor device is integrated into a consumer device.
Figure 4:
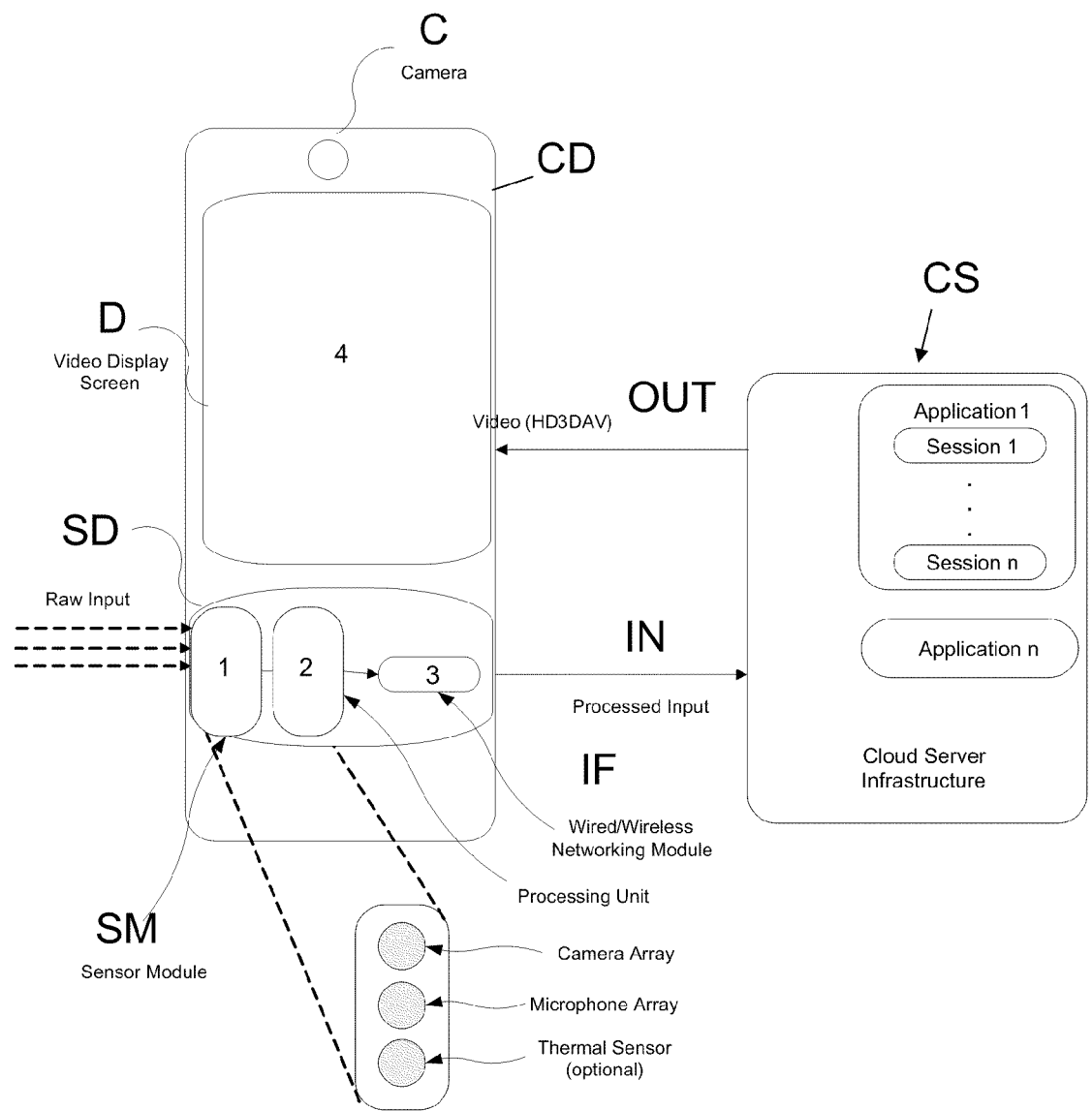
FIG. 4 shows a third embodiment wherein the sensor device is integrated into a mobile consumer device.

In FIG. 3 a second embodiment of the invention is shown wherein the sensor device SD is integrated into a consumer device CD, such as a TV set having flat screen display D. The consumer device can be any device for providing entertaining output to the user(s). The sensor device SD can also be part of a game console or any other computing device. In FIG. 3 the consumer device CD further comprises a projection module P for presenting visual output to the users such as laser beams to project feedback from the game server(s) CS. Further to this there is a wired or wireless network module N for receiving further input data from external user control devices such as keypads, gamepads, joysticks or the like. These data are then also transmitted via the interface module IF to the remote server(s) CS. As shown in FIG. 4 the sensor device SD and the display device D can be integrated in the same housing. This means that e.g. the sensor device SD can be part of a TV set or flat screen being equipped with an IP interface (see FIG. 4) to be connected with a remote IP-based entertainment service provided by the servers CS. Thus the user(s) only need(s) to set up a single device and can instantly profit from the latest technology since all updates/upgrades are made at the remote site, i.e. on the servers CS.

In FIG. 4 a third embodiment of the invention is shown wherein the sensor device SD is integrated into a mobile consumer device CD, such as a mobile phone or personal assistant having a display D. The sensor device can also be part of any other consumer device, such as a DVD and/or BlueRay player, a set top box.

Figure 5:
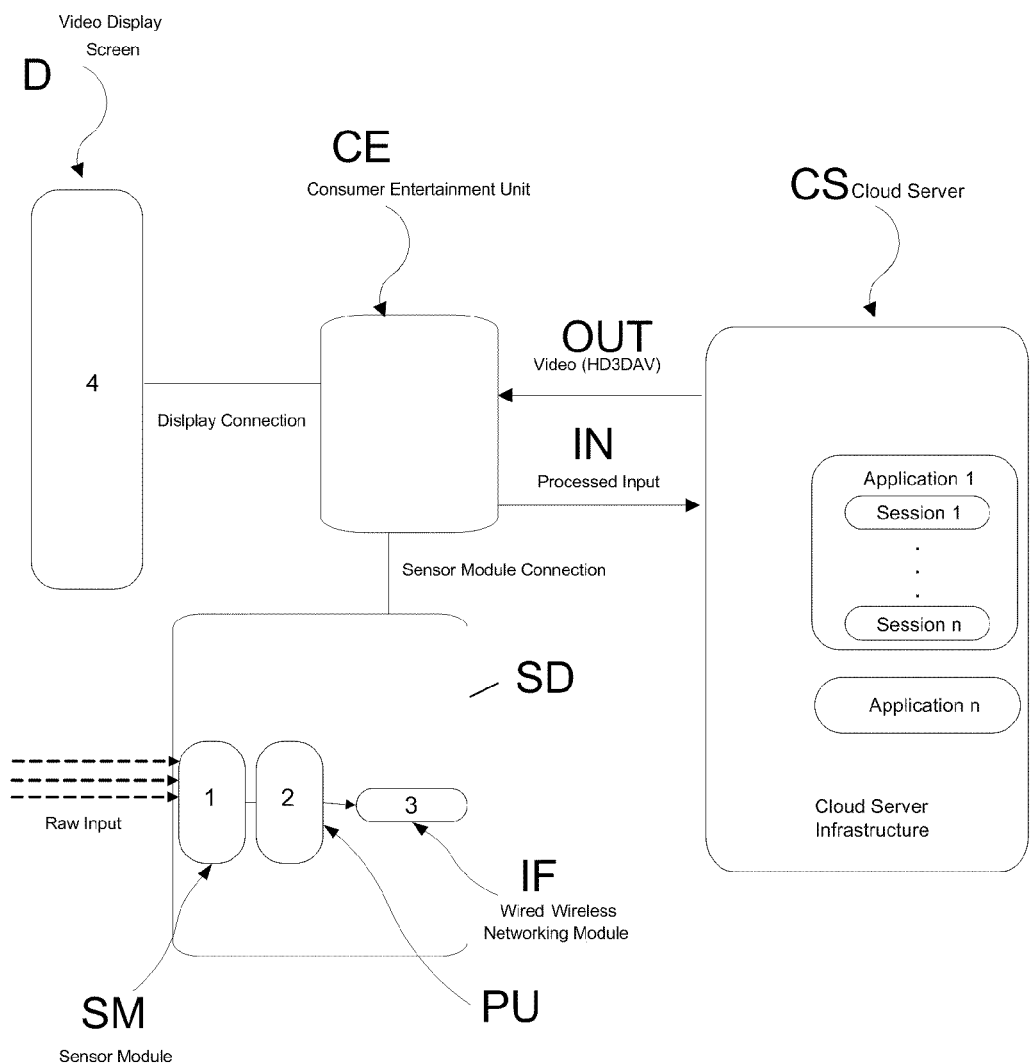
FIG. 5 shows a fourth embodiment wherein the sensor device is connected to a consumer entertainment device.

In FIG. 5 a fourth embodiment of the invention is shown wherein the sensor device SD built as a separate unit to be connected to any computing device such as the shown consumer entertainment device/unit CE.

By comparing FIGS. 2 to 5 it is clear that the sensor device SD can be a separate unit from the display screen or can be wholly integrated with the display screen or the consumer device to form a single unit. As shown in all the FIGs the sensor module SM can comprise multiple types of sensory elements. The preferred sensory elements are optical sensors, in particular at least one camera, and at least one acoustical sensor, such as microphone. Option sensory elements can also be incorporated, such as a thermal sensor.

By this design rich input data IN which relates to the detected user activities is provided to control the system and to enable the user(s) to interact with the entertainment program running on the remote server(s) CS. The user's raw unprocessed input (touchfree natural input such as a gesture) is detected by the sensor module SM. A plurality of input streams can be delivered by each user, either simultaneously or sequentially. The input streams detected by the sensor module SM can be passive or active. This means that the active input streams are generated through explicit actions by the user. These actions can consist of speech and physical gestures, for example. The passive input streams can consist of the user's physical appearance (e.g. height or facial features), thermal signature (e.g. body temperature), and other data.

All of the raw input are converted into user-related input data IN. These data can be pre-processed, e.g. by applying pattern recognition to detect specific gestures, speech or the like. The pre-processing stage can occur locally on the user's site, i.e. in the sensor device SD, or can occur remotely on the cloud computing infrastructure CS. During the pre-processing stage, various parameters such as position, timing, and user differentiation are resolved for each discrete input.

As shown in FIG. 3 by network module N the sensor device can also receive further input data from external devices. This means that the user may also use an external input device such as a keyboard. Then the data input streams from such external devices would be received by the module N and could be combined and processed with the raw input streams detected by the sensor module SM. The combined and processed input could then be transmitted over the high-speed IP based data network NET to the cloud infrastructure CS for further processing and interpretation by the software entertainment or gaming application. After the user-related input IN is processed by the application, a response is computed and transmitted back as output OUT to the user over the high-speed data network NET. These output OUT preferably is a (downlink) data stream consisting primarily of high-definition video and audio. Additional data such as text, three-dimensional data, and stereoscopic three-dimensional data may also be transmitted.

This user-related input process repeats itself with a regular frequency (e.g. 30 times per second) throughout the course of the session to deliver a smooth coherent synchronized data stream to the user, typically manifested as one or more of the following: full-motion two-dimensional video, full-motion three-dimensional stereoscopic data, audio, and graphical user interface elements.

The cloud server infrastructure CS provides shared computing and storage resources for all users of the system. The system can thus support a massive number of simultaneous users who can interact with one another either in the same location on a single device, or from different locations with multiple devices. The cloud preferably is a cluster of actual servers that are connected in a self organizing form (said cloud) to distribute its performance in a dynamic and optimal way. This processing cloud needs not to provide the content as such. This can be provided by a further server or cloud (content cloud; not shown here) which represents an Online Game Catalogue providing all data for the desired games to be played by the audiences visiting the theaters. The content data is then transmitted to the processing cloud CS. After calculation these cloud servers CS send the output data OUT back to the client, i.e. to the display device D (at home or in the theater room).

In the field of games the most prominent data which have to be calculated are the visuals of the highest quality. By establishing a cloud of gaming servers CS the client has always the best performance guaranteed no matter what performance the local client is capable of. Depending on the application the service is not limited to graphics only. Any demanding process can be managed by the computing cloud CS. A preferred field of use is theater gaming. Here the small increase in lag (time lapse added due to the transport of the data forth and back) is negligible, and the demand for extreme performance makes it the best choice in terms of cost efficiency.

In summary the present invention relates to a computer-controlled video entertainment system and to a sensor device providing user-related input data to said system. The invention provides an easy-to-install sensor device having direct access to an IP-based network, in particular to the Internet, for transmitting sensor signals or data derived thereof as user-related input data via the IP-based network to a remote computing device or server, preferably to a cloud of servers, which then process these input data for controlling the running entertainment program. The sensor device can be made simple, since it is mainly designed to detect user activities and to generate sensor signals which are directly transmitted as input data to the remote computer(s) or server(s). Because of the fact that the sensor device can directly be connected to the IP-based network (e.g. Internet) it can directly communicate with any IP-based computing device (gaming server or the like) being installed remotely and having powerful hardware and software to process the received input data. Thus there is no need to have a computer or game console being installed at the location of the user(s). This means that the users just need to have installed at their location (at home, in a cinema . . . ) a display device which is connected to the Internet and said sensor device which also is connected to the Internet so that both devices can communicate with the remote computer(s) which run(s) the entertainment program. The users need not to take care of updating and/or upgrading, but can always profit from the latest technology.

The invention, in particular the cloud being described here, can be used in all fields of providing interactive entertainment applications or content and also of providing non-interactive content. The invention can support Internet applications via any networks and/or media, including WiFi (Wireless Fidelity), BPL (broadband power line), LAN. WiMax (Worldwide Interoperability for Microwave Access) or any other standard technology. The mobile device of the present invention can operate to receive all kinds of interactive, non-interactive applications, such as movies and music, streamed from the cloud.

What is claimed is:

1. A computer-controlled video entertainment system, the system comprising:
    a display device comprising a network interface to directly connect to an IP-based network configured to receive output data via the IP-based network, wherein the output data transmitted via the IP-based network to the display device include rendered video data for instantly presenting rendered video to at least one user;
    at least a first and a second plurality of remotely installed computing servers, each plurality of computing servers being linked to each other to form a first and second cluster, the computing servers being installed remotely from said display device, wherein one of the first and second cluster is a processing cluster configured to execute an entertainment software application for providing output data to be transmitted via the IP-based network to said display device to display the rendered video, wherein the processing cluster is further configured to host a dynamic game engine, including a rendering engine, configured to generate the rendered video data to be transmitted via the IP-based network to the display device, wherein the rendered video data is ready for display by the display device when it is transmitted by the processing cluster to the display device, and wherein the other of the first and second cluster is a content cluster configured to provide content data to the processing cluster; and a sensor device directly connected to the IP-based network to transmit input data via the IP-based network, the sensor device being installed in the vicinity of said display device and comprising at least one optical sensory element and at least one acoustic sensory element for providing user-related input data as rich input data to be processed by said entertainment software application executed on the processing cluster, the sensor device further comprising a network interface being different from the network interface of the display device and configured to directly transmit said input data via said IP-based network to said processing cluster, wherein the processing cluster is further configured to render graphics under control of the user-related input data, wherein the user-related input data are sensor signals of the sensor device or data derived thereof, and to transmit the rendered data directly to the display device.

2. The computer-controlled video entertainment system of claim 1, wherein the plurality of remotely installed computing servers are linked to each other to form a cluster or cloud of computing servers to form an overall cloud wherein the cluster or cloud of computing servers comprises at least one gateway server configured to be accessed by the display device, wherein the at least one gateway server is configured to build up a video streaming link to the display device.

3. The computer-controlled video entertainment system of claim 2, wherein the computing servers are linked to each other via said IP-based network.

4. The computer-controlled video entertainment system of claim 1, wherein said IP-based network is constituted by the Internet.

5. The computer-controlled video entertainment system of claim 1, wherein said network interface of said sensor device is a wired or wireless Internet module directly connecting the sensor device to the Internet.

6. The computer-controlled video entertainment system of claim 1, wherein said sensor device comprises a sensor module with at least one sensory element for detecting user activities, in particular natural user inputs such as physical gestures and/or speech, and for producing sensor signals.

7. The computer-controlled video entertainment system of claim 6, wherein said sensor device further comprises a processing unit for processing said sensor signals to generate said user-related input data representing said detected user activities.

8. The computer-controlled video entertainment system of claim 7, wherein the processing unit provides said user-related input data to said network interface for being transmitted via said IP-based network to said plurality of remotely installed computing servers.

9. The computer-controlled video entertainment system of claim 6, wherein said at least one sensor element is an optical sensor configured to detect physical gestures or appearance of the at least one user, an acoustical sensor for detecting user-produced speech, sound or noise and/or a thermal sensor for detecting physical condition by temperature.

10. The computer-controlled video entertainment system of claim 7, wherein said processing unit receives from said sensor elements the sensor signals and generates raw input data which represent said sensor signals.

11. The computer-controlled video entertainment system of claim 7, wherein said processing unit receives from said sensor elements the sensor signals and pre-processes these signals to generate said input data, in particular by applying signal and/or data recognition to generate input data which represent recognized user-related input patterns, in particular gestures and/or speech commands.

12. The computer-controlled video entertainment system of claim 11, wherein said processing unit receives sensor signals which relate to a plurality of users and processes these signals to generate collective input data, in particular by applying signal and/or data recognition to generate collective input data which represent recognized multi-user or user-group-related input patterns, in particular collective gestures and/or collective speech commands.

13. The computer-controlled video entertainment system of claim 1, wherein said sensor device further comprises a visual output or projection module to output visual data to said at least one user, in particular laser-based projection allowing user activities.

14. The computer-controlled video entertainment system of claim 1, wherein said sensor device further comprises a wired or wireless interface/networking module to receive further input data from external user input devices, in particular from gamepads, joysticks, keypads, keyboards.

15. The computer-controlled video entertainment system of claim 1, wherein the sensor device comprises at least two optical sensory elements and at least one acoustic sensory element.

16. The computer-controlled video entertainment system of claim 1, wherein said at least one interface of said sensor device is at least one of the following interfaces:
  a wired or wireless network interface for an IP-based network, in particular for the Internet,
  a wireless interface module, and/or
  a wired interface connector for providing a wired or wireless connection between said sensor device and said plurality of remotely installed computing servers.

17. The computer-controlled video entertainment system of claim 1, wherein said sensor device is a built-in device being installed in said display device.

18. The computer-controlled video entertainment system of claim 1, wherein said display device being a consumer display device, in particular a flat screen display or a TV set.

19. The computer-controlled video entertainment system of claim 1, wherein each plurality of computing servers is installed at a different location.

* * * * *